(12) United States Patent
Shakkarwar (10) Patent No.: US 7,392,398 B1
(45) Date of Patent: Jun. 24, 2008

(54) METHOD AND APPARATUS FOR PROTECTION OF COMPUTER ASSETS FROM UNAUTHORIZED ACCESS

(75) Inventor: Rajesh G. Shakkarwar, Cupertino, CA (US)

(73) Assignee: ATI International SRL, Christchurch (BB)

( * ) Notice: Subject to any disclaimer, the term of this patent is extended or adjusted under 35 U.S.C. 154(b) by 420 days.

(21) Appl. No.: 09/586,907

(22) Filed: Jun. 5, 2000

(51) Int. Cl.
G06F 21/00 (2006.01)
G06F 21/02 (2006.01)
G06F 21/04 (2006.01)

(52) U.S. Cl. .................. 713/189; 713/193; 726/16; 726/2; 711/100

(58) Field of Classification Search ............ 713/200; 380/287
See application file for complete search history.

(56) References Cited

U.S. PATENT DOCUMENTS

| | | | | | |
|---|---|---|---|---|---|
| 5,448,045 | A | * | 9/1995 | Clark | 235/382 |
| 5,475,839 | A | * | 12/1995 | Watson et al. | 713/2 |
| 5,537,540 | A | * | 7/1996 | Miller et al. | 714/38 |
| 5,586,301 | A | * | 12/1996 | Fisherman et al. | 711/152 |
| 5,774,652 | A | * | 6/1998 | Smith | 726/20 |
| 5,805,844 | A | * | 9/1998 | Gustin et al. | 710/309 |
| 5,832,208 | A | * | 11/1998 | Chen et al. | 713/201 |
| 5,956,481 | A | * | 9/1999 | Walsh et al. | 713/200 |
| 6,167,520 | A | * | 12/2000 | Touboul | 713/200 |
| 6,205,547 | B1 | * | 3/2001 | Davis | 713/1 |
| 6,330,648 | B1 | * | 12/2001 | Wambach et al. | 711/163 |
| 6,560,613 | B1 | * | 5/2003 | Gylfason et al. | 707/200 |
| 6,694,436 | B1 | * | 2/2004 | Audebert | 726/9 |
| 2005/0193220 | A1 | * | 9/2005 | Little et al. | 713/201 |
| 2007/0028292 | A1 | * | 2/2007 | Kabzinski et al. | 726/2 |

OTHER PUBLICATIONS

Schneier, Bruce, Applied Cryptography, 1996, John Wiley & Sons, Inc. 2nd Edition.*
Conover, Leigh, et al. The GartnerGroup Glossary of Information Technology Acronyms and Terms, 1998, InfoEdge, Inc.*

* cited by examiner

Primary Examiner—Syed A. Zia
(74) Attorney, Agent, or Firm—Vedder Price P.C.

(57) ABSTRACT

A method and apparatus for protection of computer assets from unauthorized access is described. A protection engine is incorporated into microprocessor support circuitry to control access to computer assets, for example, BIOS memory and peripheral devices. The protection engine is capable of monitoring the state of an switch and controlling access to computer assets based, in part, on the state of the switch. The protection engine is capable of authenticating the source of interface control commands using cryptographic techniques. The protection engine provides protection against computer viruses, malicious cookies and java/javascript applets, macros, unauthorized remote access to a computer system, and other forms of unauthorized access.

73 Claims, 7 Drawing Sheets

METHOD AND APPARATUS FOR PROTECTION OF COMPUTER ASSETS FROM UNAUTHORIZED ACCESS

TECHNICAL FIELD OF THE INVENTION

The invention relates generally to computer systems and more specifically to protection of computer assets from unauthorized access.

BACKGROUND OF THE INVENTION

Computers often are used to store sensitive data or perform critically important tasks. Thus, it is desirable to prevent unauthorized access to computer system, especially if that unauthorized access involves attempts to change data or alter the configuration of the computer system.

Computer viruses are an example of one type of unauthorized access to a computer system. Viruses are executable programs that may be sent to unsuspecting users through some form of data exchange. Such data exchange can include sharing files or receiving electronic mail (e-mail). Virus executable programs are often attached to the shared files or are sent as e-mail attachments. Once a user receives the virus program in his or her computer system, it waits in the system for unintentional invocation by the user. Such invocation executes the virus program, thereby allowing unauthorized access to the computer system. Some computer viruses destroy a hard disk drive (HDD) boot sector and file allocation table (FAT) by writing invalid data to these areas, rendering all of the data on the HDD permanently inaccessible. These types of viruses are among the most dangerous viruses, as the HDD data cannot be recovered. Other examples include cookies and java/javascript applets received during internet access, macros embedded in documents, and remote login access.

Many attempts have been made to secure computer systems. Obviously, a computer system can be locked in a physically secure location with no communication with the outside world. However, such precautions also substantially reduce the usefulness of the computer system.

Software has been developed to monitor a computer system and prevent unauthorized access. However, since the unauthorized access may involve attempts to change data or alter the configuration of the computer system, it is possible that software for monitoring the computer system and preventing unauthorized access could itself be altered to circumvent it. Thus, a technique is needed to protect computer assets from unauthorized access that is immune from alteration, but that does not reduce the usefulness of the computer system.

DETAILED DESCRIPTION OF A PREFERRED EMBODIMENT

A method and apparatus for protection of computer assets from unauthorized access is described. A protection engine is incorporated into microprocessor support circuitry to control access to computer assets, for example, BIOS memory and peripheral devices. The protection engine is capable of monitoring the state of an electrical switch and controlling access to computer assets based, in part, on the state of the electrical switch. The protection engine is capable of authenticating the source of interface control commands using cryptographic techniques. The protection engine provides protection against computer viruses, malicious cookies and java/javascript applets, macros, unauthorized remote access to a computer system, and other forms of unauthorized access.

In a modern architecture for computers, internet appliances, set-top boxes, etc., HDD's are typically connected through an integrated drive electronics (IDE) interface to a south bridge logic core. An IDE controller incorporated in the south bridge logic core performs and controls read and write accesses to the HDD. In accordance with an embodiment of the present invention, a protection engine is incorporated into the south bridge logic core. The protection engine is coupled to the IDE controller and monitors IDE accesses. Among other things, the protection engine looks for any write accesses to the HDD boot sector or FAT. In case the protection engine encounters such an access, protective action is taken.

The protection engine monitors write access to HDD boot sector. The HDD boot sector is normally only written to during formatting of the hard disk drive. One embodiment of the protection engine has a disk formatting enable/disable input connected to an electrical switch (a physical switch) on the exterior of the computer case. In case the protection engine encounters an access to the boot sector, it looks for the status of the disk formatting enable/disable input. If disk formatting is disabled, the protection engine disables the IDE controller write accesses to the boot sector, thus protecting it from corruption by a virus. If disk formatting is enabled, the protection engine enables the IDE controller write accesses to the boot sector, thus allowing the disk to be reformatted. Computer systems are shipped with the disk formatting enable/disable input in the disabled state, thus protecting the boot sector from viruses. The end user can physically change the state of the switch if he or she intends to reformat the hard disk drive. The protection engine thereby provides complete protection of the boot sector and cannot be compromised by any current or future viruses.

The protection engine monitors write accesses to the FAT. The FAT is normally written to only when a new file is created or an old file is deleted. The protection engine checks the file type extension for all writes to the FAT. If the protection engine encounters an executable file being written to the FAT, it disables the accesses and warns the user. As with the HDD boot sector, a hardware switch allows an end user control over all the executable file writes to the FAT. Thus, the protection engine provides complete protection of the FAT.

The invention may be practiced using a software-based switch instead of (or in conjunction with) the hardware switch. For example, one or more bits in a register or memory device may be set and/or cleared to store a status of the software-based switch. Cryptographic techniques may be used to prevent the switch from being changed by a virus or malicious programs. For example, digital signatures may be used to sign any change made to the software-based switch, thereby allowing authentication of the switch status.

The invention may be practiced using a cryptographic authentication technique to authenticate the source of commands, for example, commands that carry a high risk of harm to the system. Such cryptographic authentication techniques may include a challenge and response protocol using a cryptographic technique to verify a response for a given challenge.

The protection engine is capable of providing protection to other computer assets besides the hard disk drive. For example, the protection engine is capable of protecting floppy disk drives (FDDs), parallel ports, serial ports, basic input/output system (BIOS) memory, and thermal management assets, as well as other mass storage devices, for example, writable optical or magneto-optical drives, etc.

Figure 1:
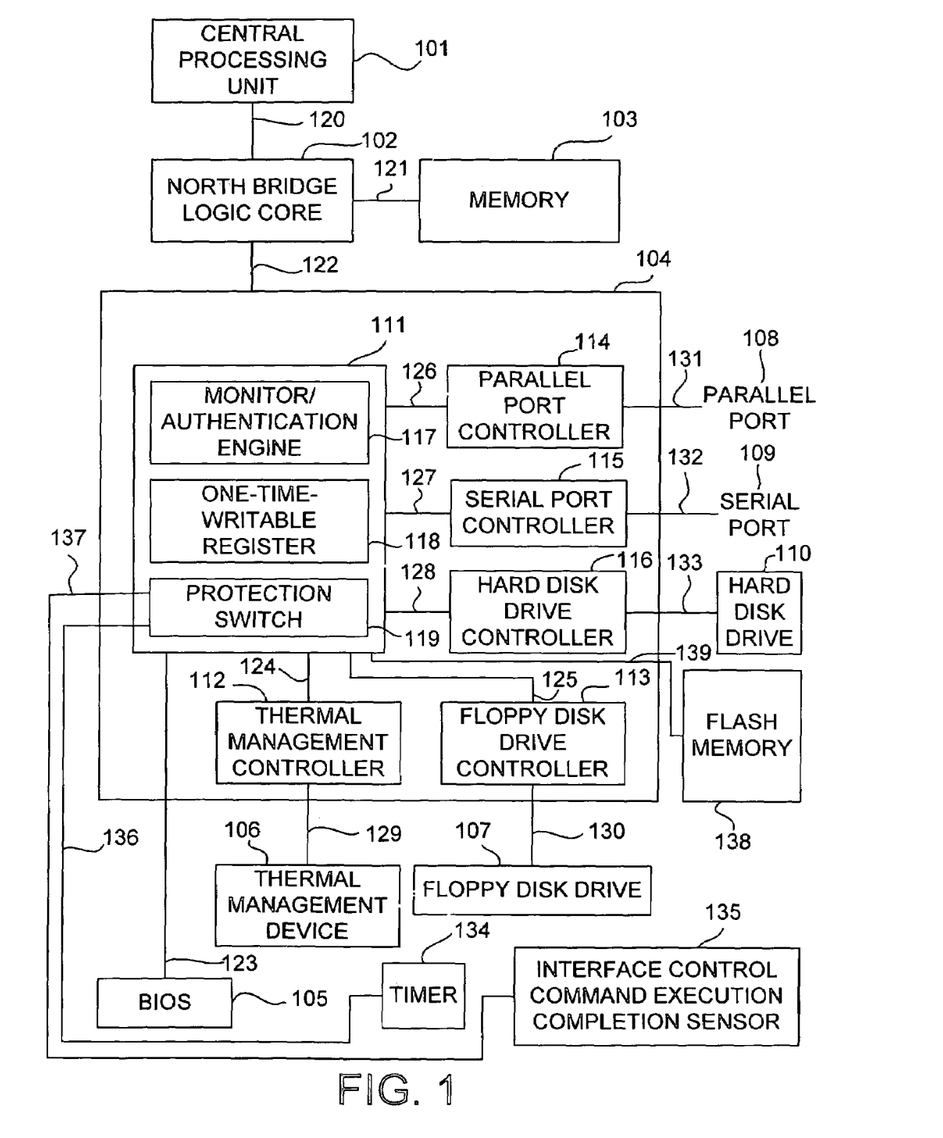
FIG. 1 is a block diagram illustrating a system including a protection engine in accordance with the present invention.

FIG. 1 is a block diagram illustrating a system including a protection engine in accordance with the present invention. The system includes a central processing unit (CPU) 101, north bridge logic core 102, memory 103, south bridge logic core 104, BIOS 105, thermal management device 106, floppy disk drive 107, parallel port 108, serial port 109, hard disk drive 110, timer 134, interface control command execution completion sensor 135, and flash memory 138. CPU 101 is coupled to north bridge logic core 102 via coupling 120. Memory 103 is coupled to north bridge logic core 102 via coupling 121. North bridge logic core 102 is coupled to south bridge logic core 104 via coupling 122.

South bridge logic core 104 includes protection engine 111. Protection engine 111 may include a monitor/authentication engine 117, a one-time-writable register 118, and a protection switch 119. The protection switch 119 is coupled to timer 134 via coupling 136. The protection switch is coupled to interface control command execution completion sensor 135 via coupling 137. The protection switch may be implemented in hardware (for example, using a physical switch) or in software (for example, using a register or memory device). Timer 134 and interface control command execution completion sensor 135 may be incorporated within protection engine 111. Timer 134 may be implemented using hardware or software to determine when a given number of clock cycles have occurred or when a real-time clock undergoes a certain change. Interface control command execution completion sensor 135 may be implemented using hardware or software to monitor signals and data indicative of the progress of the execution of the interface control command. The interface control command execution completion sensor 135 provides an indication when the execution of the interface control command is completed. The protection engine 111 is coupled to BIOS 105 via coupling 123. The protection engine 111 is coupled to flash memory device 138 via coupling 139. The protection engine 111 is coupled to thermal management controller 112 via coupling 124. The thermal management controller is coupled to a thermal management device 106 via coupling 129. The protection engine 111 is coupled to a floppy disk drive (FDD) controller 113 via coupling 125. The FDD controller is coupled to a FDD 107 via coupling 130.

The protection engine 111 is coupled to a parallel port controller 114 via coupling 126. The parallel port controller 114 is coupled to a parallel port 108 via coupling 131. The protection engine 111 is coupled to a serial port controller 115 via coupling 127. The serial port controller 115 is coupled to a serial port 109 via coupling 132. The protection engine 111 is coupled to a HDD controller 116 via coupling 128. The HDD controller is coupled to a HDD 110 via coupling 133.

CPU 101 executes software that is stored in memory 103. When the software initiates an interface control command to cause a write access to a device other than memory 103, the north bridge logic core 102 passes the interface control command to south bridge logic core 104. Within south bridge logic core 104, protection engine 111 monitors the interface control command. The interface control command may be provided by CPU 101 to protection engine 111 via north bridge logic core 102, with protection engine 111 controlling whether the interface control command is provided to BIOS 105, flash memory 138, or controller 112, 113, 114, 115, or 116. Alternatively, the interface control command may be provided by CPU 101 to BIOS 105, flash memory 138, or controller 112, 113, 114, 115, or 116 via north bridge logic core 102, with BIOS 105, flash memory 138, or controller 112, 113, 114, 115, or 116 referring the interface control command to protection engine 111. As another alternative, CPU 101 could provide the interface control command to both protection engine 111 and to BIOS 105, flash memory 138, or controller 112, 113, 114, 115, or 116 via north bridge logic core 102.

Protection engine 111 is capable of determining whether the interface control command poses a security risk. This determination may include monitoring the type of interface control command, the type of device being accessed, and/or the location being accessed within the device. Protection engine 111 is capable of authenticating the source of the interface control command. For example, protection engine 111 may use a cryptographic technique, such as digital signatures, to authenticate the source of the interface control command.

Protection engine 111 is capable of either deciding not to execute the command or deferring it to the end user. The end user interactions may be protected using cryptographic techniques or physical switches.

Figure 2:
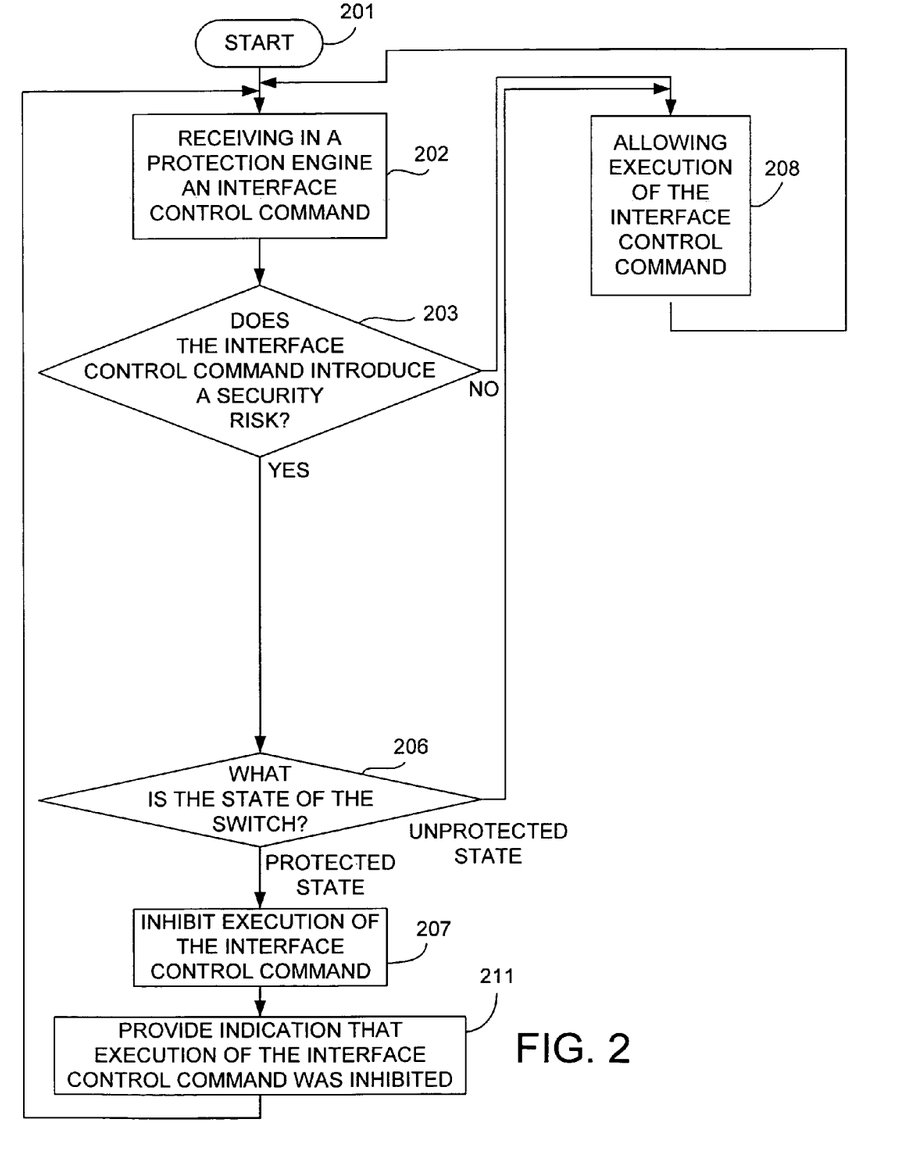
FIG. 2 is a flow diagram illustrating a process in accordance with the present invention.

FIG. 2 is a flow diagram illustrating a process in accordance with the present invention. The process begins in step 201. In step 202, an interface control command is received in protection engine 111. In step 203, a determination is made as to whether or not the interface control command introduces a security risk. If it is determined that the interface control command introduces a security risk, the process continues to step 206.

In step 206, a determination is made as to the state of the switch. If the switch is determined to be in a protected state, the process continues in step 207. In step 207, execution of the interface control command is inhibited. From step 207, the process continues in step 211. In step 211, an indication is provided that execution of the interface control command was inhibited. From step 211, the process returns to step 202.

If, in step 203, the determination was made that the interface control command does not introduce a security risk or, in step 206, the determination was made that the state of the switch is an unprotected state, the process continues to step 208. In step 208, execution of the interface control command is allowed to occur. From step 208, the process returns to step 202.

Step 208 may include the step of allowing data to be written to a hard disk drive, which may include the step of allowing data to be written to a boot sector of the hard disk drive and/or the step of allowing data to be written to the FAT of the hard disk drive. Step 208 may include the step of allowing data to be written to a floppy disk drive, to a BIOS memory, to a flash memory device, to a parallel port, or to a serial port. The step of allowing data to be written to a serial port may include the step of allowing data to be written to a universal serial bus (USB) or to an IEEE-1394 interface. Step 208 may include executing a command for a thermal management controller 112 that controls thermal management device 106.

Step 203 may include the step of determining whether the interface control command is a hard disk drive formatting command, a boot sector write command, or a program file write command. The step of determining whether the interface control command is a program file write command may include the steps of obtaining a file extension from the interface control command and determining whether the file extension is an executable file extension. The step of determining whether the file extension is an executable file extension may include the step of determining whether the file extension is a .exe, .com, .bat, or .bin extension.

Step 203 may include the step of determining whether the interface control command changes a file attribute. The file attribute enables or disables execution of a file corresponding to the file attribute.

Step 203 may include the step of determining whether the interface control command disables a thermal management subsystem. The thermal management subsystem may include a thermal management controller 112 and a thermal management device 106, for example, a fan.

Step 203 may include the step of determining whether the interface control command is a write command to write to system firmware, for example, a basic input/output system (BIOS). Step 203 may include the step of determining whether the interface control command is a write command to write to a parallel port or to a serial port. The serial port may include an RS-232 serial port, a universal serial bus (USB), or an IEEE-1394 interface, or any other serial port.

Step 203 may include the step of determining whether the interface control command is a write command to write to a flash memory device. Step 206 may include the step of checking a physical switch and/or the step of checking a software-based switch.

Figure 3:
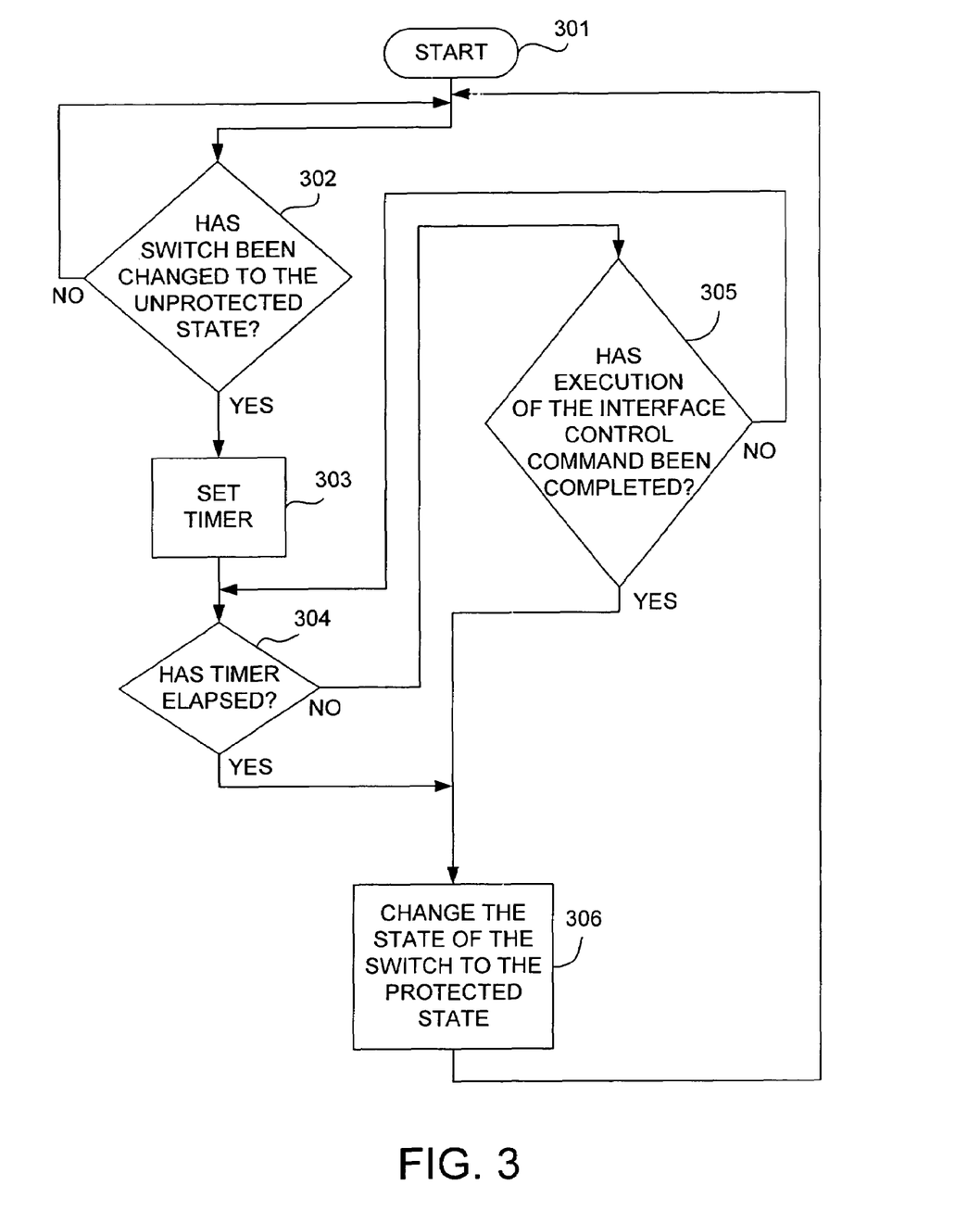
FIG. 3 is a flow diagram illustrating a process for monitoring and controlling a state of a switch in accordance with one embodiment of the invention.

FIG. 3 is a flow diagram illustrating a process for monitoring and controlling a state of a switch in accordance with one embodiment of the invention. The process begins in step 301 and continues to step 302. In step 302, a determination is made as to whether or not a switch has been changed to an unprotected state. If so, the process continues to step 303. If not, the process returns to step 302.

In step 303, a timer is set. The timer may be set to any desired value, although it may be preferable to select values of sufficient duration to allow execution of desired commands without requiring further switch manipulation. It may also be preferable to select values that are sufficiently short in duration to provide protection against undesired commands that may follow desired commands. Furthermore, values may be selected for the timer that serve to reset the switch in the event that a user forgets to reset the switch. From step 303, the process continues to step 304.

In step 304, a determination is made as to whether or not a timer duration has elapsed. The timer is initially set to a pre-determined duration and begins to measure that duration when a switch is changed from a protected state to an unprotected state. If the timer duration has not elapsed, the process continues to step 305.

In step 305, a determination is made as to whether or not the execution of the interface control command has been completed. If the execution of the interface control command has not been completed, the process returns to step 304. If the execution of the interface control command has been completed, the process continues to step 306.

If, in step 304, it is determined that the timer duration has elapsed, the process continues to step 306. In step 306, the state of a switch is changed to a protected state. From step 306, the process returns to step 302.

Figure 4:
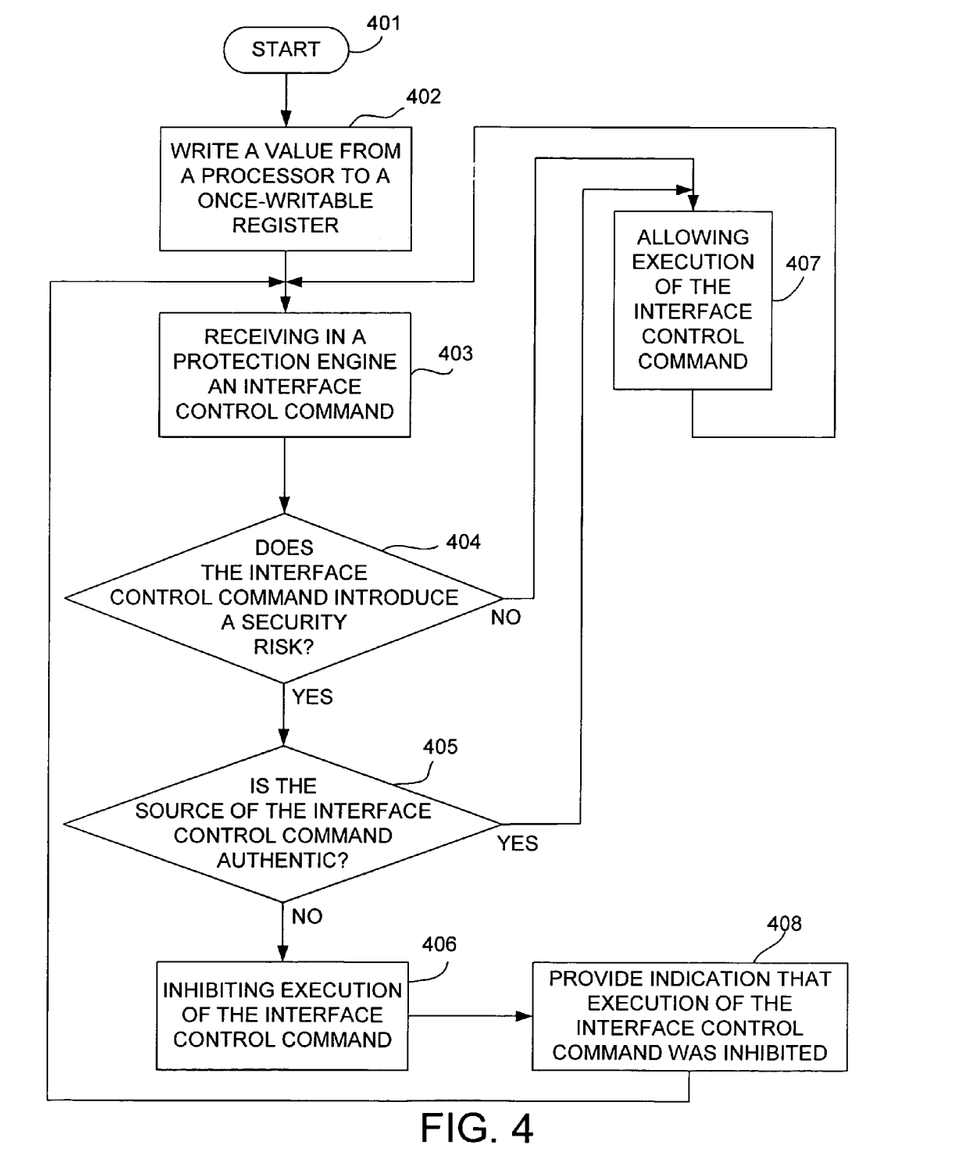
FIG. 4 is a flow diagram illustrating a process in accordance with the present invention.

FIG. 4 is a flow diagram illustrating a process in accordance with the present invention. The process begins in step 401 and continues to step 402. In step 402, a value is written from a processor to a one-time-writable register. Step 402 preferably occurs during a bootstrap loading process (also referred to as a boot process) after power is first applied to a computer system or when the computer system is reset. The value is preferably written under the control of the operating system, rather than under the control of application software. The bootstrap loading process is typically controlled by a firmware program built into a computer system and occurs before application software is enabled, thereby decreasing the likelihood of tampering with or unauthorized monitoring of step 402.

From step 402, the process continues to step 403. In step 403, the protection engine receives an interface control command. From step 403, the process continues to step 404. In step 404, a determination is made as to whether or not the interface control command introduces a security risk. If the interface control command introduces a security risk, the process continues to step 405. In step 405, a determination is made as to whether or not the source of the interface control command is authentic. If the source of the interface control command is not authentic, the process continues to step 406. In step 406, execution of the interface control command is inhibited. From step 406, the process continues to step 408. In step 408, an indication is provided that execution of the interface control command was inhibited. This indication may be provided, for example, to a user or operating system. From step 408, the process returns to step 403.

If, in step 404, the interface control command is determined not to introduce a security risk or, in step 405, the source of the interface control command is determined to be authentic, the process continues to step 407. In step 407, execution of the interface control command is allowed. From step 407, the process returns to step 403.

Step 407 may include the step of allowing data to be written to a hard disk drive, which may include the step of allowing data to be written to a boot sector of the hard disk drive and/or the step of allowing data to be written to a FAT of the hard disk drive. Step 407 may include the step of allowing data to be written to a floppy disk drive, to BIOS memory, to a flash memory device, to a parallel port, or to a serial port. The step of allowing data to be written to a serial port may include the step of allowing data to be written to a USB or to an IEEE-1394 interface. Step 407 may include executing a command for a thermal management controller 112 that controls thermal management device 106.

Step 404 may include the step of determining whether the interface control command is a hard disk drive formatting command, which may include the step of determining whether the interface control command is a boot sector write command.

Step 404 may include the step of determining whether the interface control command is a program file write command, which may include the steps of obtaining a file extension from the interface control command and determining whether the file extension is an executable file extension. The step of determining whether the file extension is an executable file extension may include the step of determining whether the file extension is a .exe, .com, .bat, or .bin extension.

Step 404 may include the step of determining whether the interface control command changes a file attribute. The file attribute enables or disables execution of a file corresponding to the file attribute. Step 404 may include the step of determining whether the interface control command disables a thermal management subsystem. The thermal management subsystem may include a thermal management controller and a thermal management device, for example, a fan.

Step 404 may include the step of determining whether the interface control command is a write command to write to system firmware, for example, a BIOS or data stored in a flash memory device, or to write to a parallel port or a serial port. The serial port may be an RS-232 serial port, a USB, an IEEE-1394, or any other type of serial port.

Step 405 may include the steps of issuing a challenge to the source of the interface control command, receiving a response from the source of the interface control command, and determining whether the response is valid. The step of determining whether the response is valid may include the step of comparing the response to a value stored in the protection engine. The step of determining whether a response is valid may include the steps of performing a mathematical operation on the challenge to produce a correct response value and comparing the response to the correct response value. The step of issuing a challenge to the source of the interface control command may include the steps of obtaining a pseudorandom value and forming the challenge based on the pseudorandom value. Obfuscation techniques may be used to disguise or conceal the challenge and response communications, as well as the communications for obtaining the pseudorandom value and for passing any keys or values between system components. Software involved in authentication of the source of the interface control commands is preferably executed at the highest protected level of the operating system, for example, the ring 0 or kernel level.

Figure 5:
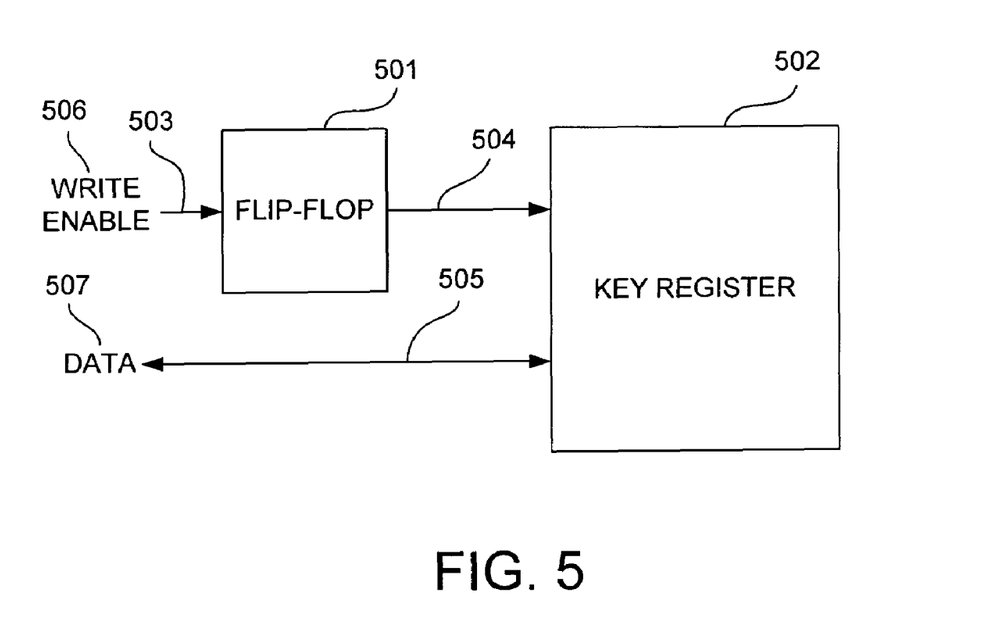
FIG. 5 is a block diagram illustrating one embodiment of a one-time-writable register for use with the present invention.

FIG. 5 is a block diagram illustrating one embodiment of a one-time-writable register for use with the present invention. The one-time-writable register includes a flip-flop 501 and a key register 502. A write enable signal 506 is applied to a write enable input 503 of flip-flop 501. An output 504 of flip-flop 501 is coupled to a write enable input of key register 502. Data 507 is communicated with key register 502 via a data bus 505.

Figure 6:
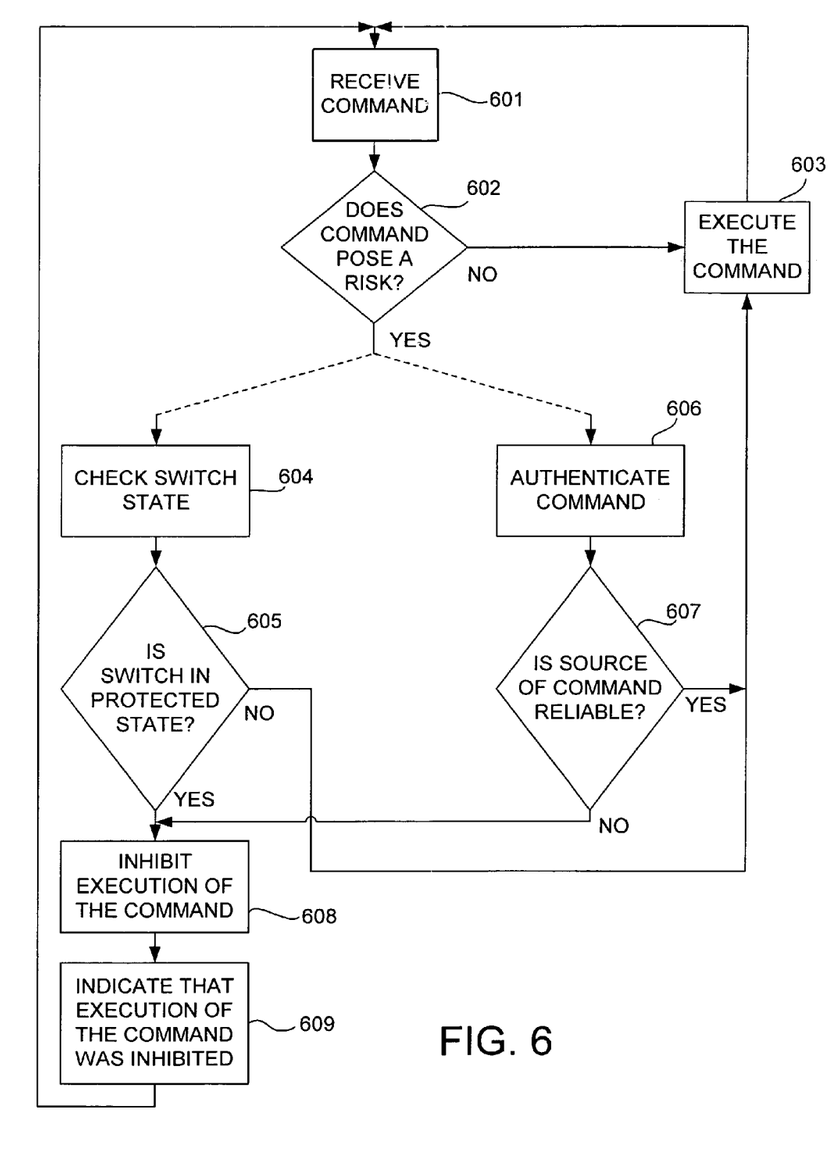
FIG. 6 is a flow diagram illustrating a process in accordance with one embodiment of the invention.

FIG. 6 is a flow diagram illustrating a process in accordance with one embodiment of the invention. In step 601, a command is received by the protection engine. In step 602, the protection engine makes a determination as to whether or not the command poses a risk. The determination may be based on the type of command being executed, the area in memory or the devices affected by the command, the data or operand associated with the command, the relationship of the command to other commands, or other criteria. The risk may include a risk of harm to any part of the system, for example, a risk of corruption of data or damage to software or hardware.

If the protection engine determines that the command poses a risk, the process continues to step 604 or step 606. If the process continues to step 604, the protection engine checks the state of a switch. In step 605, the protection engine determines whether or not the switch is in a protected state. If the switch is in the protected state, the process continues to step 608. In step 608, the protection engine inhibits execution of the command. In step 609, the protection engine provides an indication that the execution of the command was inhibited. The protection engine may provide the indication to the operating system, to an application program, to specialized protection hardware or software, to a user, to a remote location, or to another part of the system. From step 609, the process returns to step 601.

If the protection engine determined in step 602 that the command does not pose a risk or in step 605 that the switch is not in a protected state, the process continues to step 603. In step 603, the protection engine allows execution of the command. From step 603, the process returns to step 601.

If the process continues from step 602 to step 606, the protection engine authenticates the command in step 606. In step 607, the protection engine determines whether or not the source of the command is reliable. If the source of the command is determined to be reliable, the process continues to step 603. In step 603, the protection engine allows execution of the command. From step 603, the process returns to step 601.

If, in step 607, the protection engine determines that the source of the command is not reliable, the process continues to step 608. In step 608, the protection engine inhibits execution of the command. If step 609, the protection engine provides an indication that execution of the command was inhibited. From step 609, the process returns to step 601.

Figure 7:
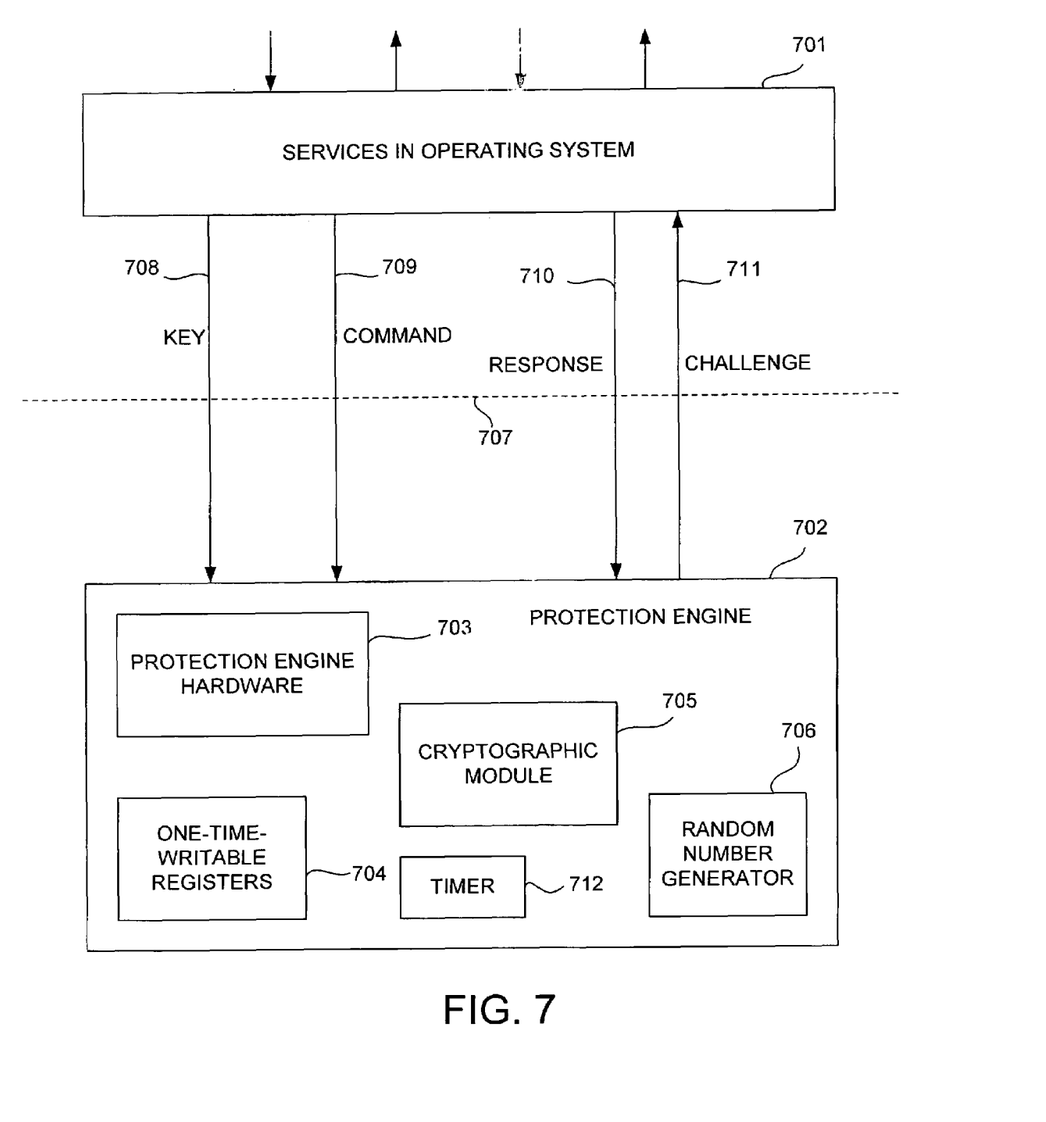
FIG. 7 is a block diagram illustrating a relationship between a protection engine and services in an operating system in accordance with one embodiment of the invention.

FIG. 7 is a block diagram illustrating a relationship between a protection engine and services in an operating system in accordance with one embodiment of the invention. Services in the operating system 701 provide a command 709 to the protection engine 702. The protection engine 702 includes protection engine hardware 703, one-time-writable registers 704, a cryptographic module 705, a random number generator 706, and a timer 712. The services in the operating system 701 may provide a key 708 to the protection engine 702 to authenticate the source of the command 709. The cryptographic module 705 of the protection engine may be used to authenticate the key 708. One-time-writable registers 704 may be used to store a copy of key 708 for comparison or information used by the cryptographic module 705 to authenticate the key 708.

The protection engine 702 may issue a challenge 711 to the services in the operating system 701. The challenge may be generated by the cryptographic module 705, for example, using a random number generated by random number generator 706. Random number generator 706 may be implemented to provide any desired level of randomness or other mathematical properties. For example, random number generator 706 may be implemented as a pseudo-random number generator.

The protection engine 702 may require a response 710 from the services in the operating system 701. The protection engine 702 may use the cryptographic module 705 to authenticate the response 710. If the response 710 is properly authenticated, the protection engine 702 may allow processing of the command 709.

Protection engine hardware 703 may include a switch that may be manipulated by a user to set a protected or unprotected state for the protection engine 702. The switch may also be controlled by other trusted entities, for example, components of the protection engine 702. For example, timer 712 may be used to reset the switch to a protected state after a given period of time elapses.

Boundary 707 represents a boundary between trusted entities, for example, the protection engine 702 and devices associated with it, and non-trusted entities, for example, elements of the system that may be subject to tampering. Security of the protection engine 702 may be maintained by requiring authentication of information communicated between the protection engine 702 and non-trusted entities.

Accordingly, a method and apparatus for protection of computer assets from unauthorized access has been described. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for protection of computer assets from unauthorized access comprising:
   receiving in a protection engine, an interface control command;
   determining whether the interface control command introduces a security risk;
   when the interface control command introduces a security risk, determining a state of a switch;
   when the state of the switch is a protected state, inhibiting execution of the interface control command; and
   when the state of the switch is an unprotected state, allowing execution of the interface control command.

2. The method of claim 1 wherein inhibiting execution of the interface control command further includes:
   providing an indication that the execution of the interface control command was inhibited.

3. The method of claim 1 further comprising:
   changing the state of the switch to the protected state when a timeout duration has elapsed.

4. The method of claim 1 further comprising:
   determining when the execution of the interface control command has been completed; and
   when the execution of the interface control command has been completed, changing the state of the switch to the protected state.

5. The method of claim 1 wherein determining the state of a switch includes:
   determining the state of an electrical switch (physical switch).

6. The method of claim 1 wherein determining the state of a switch includes:
   determining the state of a software-based switch.

7. The method of claim 6 wherein determining the state of the software-based switch includes:
   using cryptographic techniques to determine the state of the software-based switch.

8. The method of claim 1 wherein allowing execution of the interface control command further comprises:
   allowing data to be written to a hard disk drive.

9. The method of claim 8 wherein allowing data to be written to a hard disk drive comprises:
   allowing data to be written to a boot sector of the hard disk drive.

10. The method of claim 8 wherein allowing data to be written to a hard disk drive comprises:
    allowing data to be written to a file allocation table of the hard disk drive.

11. The method of claim 1 wherein allowing execution of the interface control command further comprises:
    allowing data to be written to a floppy disk drive.

12. The method of claim 1 wherein allowing execution of the interface control command further comprises:
    allowing data to be written to a BIOS memory.

13. The method of claim 1 wherein allowing execution of the interface control command further comprises:
    allowing data to be written to a parallel port.

14. The method of claim 1 wherein allowing execution of the interface control command further comprises:
    allowing data to be written to a serial port.

15. The method of claim 14 wherein allowing data to be written to a serial port further comprises:
    allowing data to be written to a universal serial bus (USB).

16. The method of claim 14 wherein allowing data to be written to a serial port further comprises:
    allowing data to be written to an IEEE-1394 interface.

17. The method of claim 13 wherein allowing execution of the interface control command further comprises:
    allowing data to be written to a flash memory device.

18. The method of claim 13 wherein allowing execution of the interface control command further comprises:
    allowing data to be written to a thermal management controller.

19. The method of claim 1 wherein determining whether the interface control command introduces a security risk comprises:
    determining whether the interface control command is a hard disk drive formatting command.

20. The method of claim 19 wherein determining whether the interface control command is the hard disk drive formatting command further comprises:
    determining whether the interface control command is a boot sector write command.

21. The method of claim 1 wherein determining whether the interface control command introduces a security risk comprises:
    determining whether the interface control command is a program file write command.

22. The method of claim 1 wherein determining whether the interface control command is a program file write command further comprises:
    obtaining a file extension from the interface control command;
    determining whether the file extension is an executable file extension.

23. The method of claim 22 wherein determining whether the file extension is an executable file extension further comprises:
    determining whether the file extension is one of an exe extension, a com extension, a bat extension, or a bin extension.

24. The method of claim 1 wherein determining whether the interface control command introduces a security risk comprises:
    determining whether the interface control command changes a file attribute, the file attribute enabling or disabling execution of a file corresponding to the file attribute.

25. The method of claim 1 wherein determining whether the interface control command introduces a security risk comprises:
    determining whether the interface control command disables a thermal management subsystem.

26. The method of claim 25 wherein determining whether the interface control command disables a thermal management subsystem comprises:
    determining whether the interface control command disables a fan.

27. The method of claim 1 wherein determining whether the interface control command introduces a security risk comprises:
    determining whether the interface control command is a write command to write to a system firmware (BIOS).

28. The method of claim 1 wherein determining whether the interface control command introduces a security risk comprises:
    determining whether the interface control command is a write command to write to a parallel port.

29. The method of claim 1 wherein determining whether the interface control command introduces a security risk comprises:
 determining whether the interface control command is a write command to write to a serial port.

30. The method of claim 29 wherein determining whether the interface control command interface control command is a write command to write to a serial port comprises:
 determining whether the interface control command is a write command to write to a universal serial bus (USB).

31. The method of claim 29 wherein determining whether the interface control command is a write command to write to a serial port comprises:
 determining whether the interface control command is a write command to write to an IEEE-1394 interface.

32. The method of claim 1 wherein determining whether the interface control command introduces a security risk comprises:
 determining whether the interface control command is a write command to write to a flash memory device.

33. A method for protection of computer assets from unauthorized access comprising:
 receiving in a protection engine in a south bridge, an interface control command;
 determining whether the interface control command introduces a security risk;
 when the interface control command introduces a security risk, determining whether a source of the interface control command is authentic;
 when the source of the interface control command is not authentic, inhibiting execution of the interface control command; and
 when the source of the interface control command is authentic, allowing execution of the interface control command.

34. The method of claim 33 wherein inhibiting execution of the interface control command further includes:
 providing an indication that the execution of the interface control command was inhibited.

35. The method of claim 33 wherein allowing execution of the interface control command further comprises:
 allowing data to be written to a hard disk drive.

36. The method of claim 35 wherein allowing data to be written to a hard disk drive comprises:
 allowing data to be written to a boot sector of the hard disk drive.

37. The method of claim 35 wherein allowing data to be written to a hard disk drive comprises:
 allowing data to be written to a file allocation table of the hard disk drive.

38. The method of claim 33 wherein allowing execution of the interface control command further comprises:
 allowing data to be written to a floppy disk drive.

39. The method of claim 33 wherein allowing execution of the interface control command further comprises:
 allowing data to be written to a BIOS memory.

40. The method of claim 33 wherein allowing execution of the interface control command further comprises:
 allowing data to be written to a parallel port.

41. The method of claim 33 wherein allowing execution of the interface control command further comprises:
 allowing data to be written to a serial port.

42. The method of claim 41 wherein allowing data to be written to a serial port further comprises:
 allowing data to be written to a universal serial bus (USB).

43. The method of claim 41 wherein allowing data to be written to a serial port further comprises:
 allowing data to be written to an IEEE-1394 interface.

44. The method of claim 33 wherein allowing execution of the interface control command further comprises:
 allowing data to be written to a flash memory device.

45. The method of claim 33 wherein determining whether the interface control command introduces a security risk comprises:
 determining whether the interface control command is a hard disk drive formatting command.

46. The method of claim 45 wherein determining whether the interface control command is the hard disk drive formatting command further comprises:
 determining whether the interface control command is a boot sector write command.

47. The method of claim 33 wherein determining whether the interface control command introduces a security risk comprises:
 determining whether the interface control command is a program file write command.

48. The method of claim 47 wherein determining whether the interface control command is a program file write command further comprises:
 obtaining a file extension from the interface control command;
 determining whether the file extension is an executable file extension.

49. The method of claim 48 wherein determining whether the file extension is an executable file extension further comprises:
 determining whether the file extension is one of an exe extension, a com extension, a bat extension, or a bin extension.

50. The method of claim 33 wherein determining whether the interface control command introduces a security risk comprises:
 determining whether the interface control command changes a file attribute, the file attribute enabling or disabling execution of a file corresponding to the file attribute.

51. The method of claim 33 wherein determining whether the interface control command introduces a security risk comprises:
 determining whether the interface control command disables a thermal management subsystem.

52. The method of claim 51 wherein determining whether the interface control command disables a thermal management subsystem comprises:
 determining whether the interface control command disables a fan.

53. The method of claim 33 wherein determining whether the interface control command introduces a security risk comprises:
 determining whether the interface control command is a write command to write to system firmware (BIOS).

54. The method of claim 33 wherein determining whether the interface control command introduces a security risk comprises:
 determining whether the interface control command is a write command to write to a parallel port.

55. The method of claim 33 wherein determining whether the interface control command introduces a security risk comprises:
 determining whether the interface control command is a write command to write to a serial port.

56. The method of claim 55 wherein determining whether the interface control command is a write command to write to a serial port comprises:
  determining whether the interface control command is a write command to write to a universal serial bus (USB).

57. The method of claim 55 wherein determining whether the interface control command is a write command to write to a serial port comprises:
  determining whether the interface control command is a write command to write to an IEEE-1394 interface.

58. The method of claim 33 wherein determining whether the interface control command introduces a security risk comprises:
  determining whether the interface control command is a write command to write to a flash memory device.

59. The method of claim 33 wherein determining whether the source of the interface control command is authentic comprises:
  issuing a challenge to the source of the interface control command;
  receiving a response from the source of the interface control command; and
  determining whether the response is valid.

60. The method of claim 59 wherein determining whether the response is valid comprises:
  comparing the response to a mathematical function of a value accessible only to the protection engine and to an operating system.

61. The method of claim 60 further comprising:
  writing the value from a processor to a one-time-writable register in the protection engine (by an operating system) during a boot process (before application software is enabled).

62. The method of claim 59 wherein determining whether the response is valid comprises:
  performing a mathematical operation on the challenge to produce a correct response value; and
  comparing the response to the correct response value.

63. The method of claim 59 wherein issuing the challenge to the source of the interface control command includes:
  obtaining a pseudorandom value; and
  forming the challenge based on the pseudorandom value.

64. Apparatus for protection of computer assets from unauthorized access comprising:
  an interface controller operatively coupled to receive an interface control command to control an interface device;
  a switch selectable between a protected state and an unprotected state;
  a protection engine operatively coupled to the interface controller to receive the interface control command and operatively coupled to the switch to detect whether the switch is in the protected state or the unprotected state to determine whether the interface control command poses a security risk and to selectively inhibit or allow execution of the interface control command by the interface controller depending on whether or not the interface control command poses the security risk and depending on whether the switch is in the protected state or the unprotected state.

65. The apparatus of claim 64 further comprising:
  a timer operatively coupled to the switch to reset the switch to the protected state after a period of time has elapsed.

66. The apparatus of claim 64 further comprising:
  an interface control command execution completion sensor operatively coupled to the switch to reset the switch to the protected state after an execution of the interface control command has been completed.

67. Apparatus for protection of computer assets from unauthorized access comprising:
  a south bridge comprising:
    an interface controller operatively coupled to receive an interface control command to control an interface device; and
    a protection engine operatively coupled to the interface controller for preventing unauthorized access to the interface device and operatively coupled to receive the interface control command to determine whether a source of the interface control command is authentic and to selectively allow or inhibit execution of the interface control command by the interface controller depending on whether or not the source of the interface control command is authentic.

68. The apparatus of claim 67 further comprising:
  a one-time-writable register operatively coupled to the protection engine to store a value used to determine whether the source of the interface control command is authentic.

69. The apparatus of claim 68 wherein the value is accessible only to the protection engine and to an operating system.

70. A method for protection of computer assets from unauthorized access comprising:
  receiving in a protection engine, an interface control command;
  determining whether the interface control command introduces a security risk determined from at least one of: a type of interface control command, an area of memory affected by the interface control command, a device affected by the interface control command, data associated with the interface control command, an operand associated with the interface control command, and a relationship of the interface control command to another interface control command;
  when the interface control command introduces a security risk, determining a state of a switch;
  when the state of the switch is a protected state, inhibiting execution of the interface control command; and
  when the state of the switch is an unprotected state, allowing execution of the interface control command.

71. The method of claim 70 including:
  physically changing the state of a hardware switch by a user;
  wherein determining the state of a switch includes determining the state of the hardware switch.

72. The method of claim 71 including performing at least one of: inhibiting data to be written to and allowing data to be written to a hard disk drive in response to determining the state of the hardware switch.

73. The method of claim 70 including:
  setting at least one bit in at least one of: a register and memory to change the state of a software-based switch;
  wherein determining the state of a switch includes:
  determining the state of the software-based switch.

* * * * *